(12) United States Patent
Hershey et al.

(10) Patent No.: US 10,656,039 B2
(45) Date of Patent: May 19, 2020

(54) PRESSURE SENSOR HAVING OVERPRESSURE PROTECTION WITH REDUCED OUTPUT ERROR

(71) Applicant: Honeywell International Inc., Morris Plains, NJ (US)

(72) Inventors: George Hershey, Blue Bell, PA (US); Richard D. Daugert, Doylestown, PA (US)

(73) Assignee: Honeywell International Inc., Morris Plains, NJ (US)

( * ) Notice: Subject to any disclaimer, the term of this patent is extended or adjusted under 35 U.S.C. 154(b) by 67 days.

(21) Appl. No.: 15/637,232

(22) Filed: Jun. 29, 2017

(65) Prior Publication Data

US 2018/0259414 A1 Sep. 13, 2018

Related U.S. Application Data

(60) Provisional application No. 62/470,080, filed on Mar. 10, 2017, provisional application No. 62/469,954, (Continued)

(51) Int. Cl.
*G01L 7/08* (2006.01)
*G01L 19/06* (2006.01)
(Continued)

(52) U.S. Cl.
CPC ............ *G01L 19/0618* (2013.01); *G01L 7/08* (2013.01); *G01L 7/082* (2013.01); *G01L 11/004* (2013.01);
(Continued)

(58) Field of Classification Search
CPC . G01L 7/08; G01L 7/082; G01L 11/00; G01L 11/004; G01L 13/02; G01L 13/026;
(Continued)

(56) References Cited

U.S. PATENT DOCUMENTS 4,072,057 A 2/1978 Yasuhara et al.
4,539,850 A 9/1985 Ziegler
(Continued)

FOREIGN PATENT DOCUMENTS

DE 102006057828 A1 * 6/2008 ........... G01L 13/025
DE 102012025070 A1 * 6/2014 ........... G01L 13/025
(Continued)

OTHER PUBLICATIONS

International Search Report and Written Opinion of the International Searching Authority for International Patent Application No. PCT/US2018/021300 dated May 29, 2018, 14 pages.
(Continued)

*Primary Examiner* — Nguyen Q. Ha (57) ABSTRACT

An apparatus includes a sensor body, a sensor configured to measure differential pressure, and first and second pressure inputs in or on the sensor body. The pressure inputs are configured to provide multiple input pressures to the sensor. Each pressure input includes a barrier diaphragm configured to move in response to pressure and an overload diaphragm configured to limit movement of the barrier diaphragm. The overload diaphragm is also configured to exert a preload force against the sensor body. The overload diaphragm of each pressure input may include multiple convolutions. Bases of the convolutions may be configured to provide the preload force, and tops of the convolutions may be separated from the sensor body by gaps. Tops of the convolutions that are non-adjacent may be configured to provide the preload force, and tops of the convolutions between the non-adjacent convolutions may be separated from the sensor body by gaps.

16 Claims, 5 Drawing Sheets

Related U.S. Application Data filed on Mar. 10, 2017, provisional application No. 62/469,716, filed on Mar. 10, 2017, provisional application No. 62/470,089, filed on Mar. 10, 2017.

(51) Int. Cl.
  *G01L 19/14* (2006.01)
  *G01L 13/02* (2006.01)
  *G01L 11/00* (2006.01)
  *G01L 15/00* (2006.01)

(52) U.S. Cl.
  CPC ........ *G01L 13/026* (2013.01); *G01L 19/0645* (2013.01); *G01L 19/0663* (2013.01); *G01L 19/14* (2013.01); *G01L 15/00* (2013.01)

(58) Field of Classification Search
  CPC ..... G01L 15/00; G01L 19/06; G01L 19/0618; G01L 19/0663; G01L 19/14
  See application file for complete search history.

(56) References Cited

U.S. PATENT DOCUMENTS

| | | | |
|---|---|---|---|
| 4,572,000 A | 2/1986 | Kooiman | |
| 4,735,098 A | 4/1988 | Kavli et al. | |
| 4,790,192 A | 12/1988 | Knecht et al. | |
| 4,905,575 A | 3/1990 | Knecht et al. | |
| 5,287,746 A * | 2/1994 | Broden | G01L 13/026 73/706 |
| 5,469,749 A * | 11/1995 | Shimada | G01F 1/363 73/721 |
| 6,631,644 B2 * | 10/2003 | Burczyk | G01L 13/025 73/715 |
| 7,432,795 B2 | 10/2008 | Kurtz et al. | |
| 8,776,608 B2 | 7/2014 | Hedtke et al. | |
| 10,345,178 B2 * | 7/2019 | Hershey | G01L 7/08 |
| 2008/0127738 A1 * | 6/2008 | Burczyk | G01L 19/0618 73/716 |
| 2014/0209220 A1 | 7/2014 | Otomo et al. | |
| 2016/0223420 A1 | 8/2016 | Grimes et al. | |

FOREIGN PATENT DOCUMENTS

| | | | |
|---|---|---|---|
| EP | 0636243 A1 | 2/1995 | |
| JP | 05079871 A * | 3/1993 | G01F 1/363 |
| WO | 9217757 A1 | 10/1992 | |
| WO | 9321506 A1 | 10/1993 | |
| WO | 0003220 A1 | 1/2000 | |

OTHER PUBLICATIONS

International Search Report and Written Opinion of the International Searching Authority for International Patent Application No. PCT/US2018/021096 dated Jun. 27, 2018, 13 pages.
"ST 800 SmartLine Pressure Transmitters User's Manual, 34-ST-25-35, Revision 10.0", Jul. 2016, Honeywell Process Solutions, 122 pages.
George Hershey et al., "Pressure Sensor Having Coplanar Meter Body With Sensor Overpressure Protection", U.S. Appl. No. 15/632,005, filed Jun. 23, 2017.

* cited by examiner

PRESSURE SENSOR HAVING OVERPRESSURE PROTECTION WITH REDUCED OUTPUT ERROR

CROSS-REFERENCE TO RELATED APPLICATIONS AND PRIORITY CLAIM

This application claims priority under 35 U.S.C. § 119(e) to the following U.S. provisional patent applications:
U.S. Provisional Patent Application No. 62/469,716 filed on Mar. 10, 2017;
U.S. Provisional Patent Application No. 62/469,954 filed on Mar. 10, 2017;
U.S. Provisional Patent Application No. 62/470,080 filed on Mar. 10, 2017; and
U.S. Provisional Patent Application No. 62/470,089 filed on Mar. 10, 2017.
All of these provisional applications are hereby incorporated by reference in their entirety.

TECHNICAL FIELD

This disclosure generally relates to pressure sensors. More specifically, this disclosure relates to a pressure sensor having overpressure protection with reduced output error.

BACKGROUND

A differential pressure transmitter generally operates by providing two pressure values to a sensor. The sensor converts a difference between the two pressure values into an electrical signal, which can then undergo additional signal processing. To achieve optimum sensitivity, the sensor may operate near a differential pressure that can cause failure of the sensor. To avoid damage to the sensor, an overpressure mechanism can be employed to limit the differential pressure that is input to the sensor.

While various overpressure protection mechanisms exist, some of these mechanisms lead to the generation of small errors in the differential pressure measurements that are output from a pressure sensor. Others of these mechanisms are costly to implement due to expensive machining operations. In addition, some of these mechanisms are simply unreliable under specific operating conditions and can still allow sensor damage to occur.

SUMMARY

This disclosure provides a pressure sensor having overpressure protection with reduced output error.

In a first embodiment, an apparatus includes a sensor body and a sensor configured to measure differential pressure. The apparatus also includes first and second pressure inputs in or on the sensor body, where the pressure inputs are configured to provide multiple input pressures to the sensor. Each pressure input includes a barrier diaphragm configured to move in response to pressure and an overload diaphragm configured to limit movement of the barrier diaphragm. The overload diaphragm is configured to exert a preload force against the sensor body.

In a second embodiment, a system includes a manifold and a pressure sensor mounted to the manifold. The pressure sensor includes a sensor body and a sensor configured to measure differential pressure. The pressure sensor also includes first and second pressure inputs in or on the sensor body, where the pressure inputs are configured to provide multiple input pressures to the sensor. Each pressure input includes a barrier diaphragm configured to move in response to pressure and an overload diaphragm configured to limit movement of the barrier diaphragm. The overload diaphragm is configured to exert a preload force against the sensor body.

In a third embodiment, a method includes conveying multiple input pressures to a sensor and measuring a differential pressure using the sensor. The multiple input pressures are conveyed using first and second pressure inputs in or on a sensor body. Each pressure input includes a barrier diaphragm configured to move in response to pressure and an overload diaphragm configured to limit movement of the barrier diaphragm, where the overload diaphragm exerts a preload force against the sensor body.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 8 illustrates an example method for overpressure protection with reduced output error according to this disclosure.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
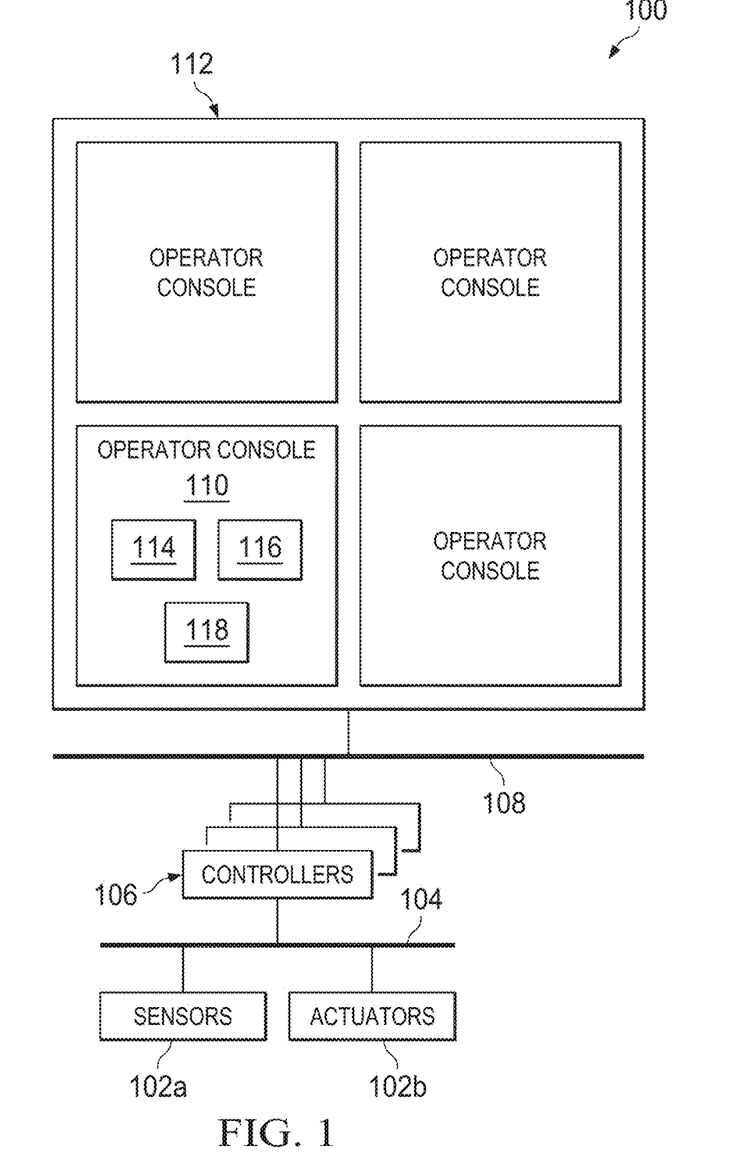
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as pressure, temperature, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control or other advanced predictive control. As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

Each operator console 110 includes any suitable structure for displaying information to and interacting with an operator. For example, each operator console 110 could include one or more processing devices 114, such as one or more processors, microprocessors, microcontrollers, field programmable gate arrays, application specific integrated circuits, discrete logic devices, or other processing or control devices. Each operator console 110 could also include one or more memories 116 storing instructions and data used, generated, or collected by the processing device(s) 114. Each operator console 110 could further include one or more network interfaces 118 that facilitate communication over at least one wired or wireless network, such as one or more Ethernet interfaces or wireless transceivers.

At least one of the sensors 102a in FIG. 1 could represent a differential pressure transmitter. As noted above, a differential pressure transmitter generally operates by providing two pressure values to a sensor, which converts a difference between the two pressure values into an electrical signal. To avoid damage to the sensor, an overpressure mechanism can be employed to limit the differential pressure that is input to the sensor.

Conventional approaches for providing overpressure protection often suffer from various shortcomings. Some approaches lead to the generation of small errors in the differential pressure measurements. Other approaches are costly to implement due to expensive machining operations. In addition, some approaches are unreliable under specific operating conditions.

In accordance with this disclosure, a differential pressure sensor having overpressure protection with reduced output error is provided. This approach allows overpressure protection to be provided in differential pressure sensors, including those having coplanar meter bodies, with reduced output errors and without the need for costly machining operations. Because output errors are reduced or minimized, this approach results in improved performance of a pressure sensor. Moreover, the overpressure protection helps to ensure that the pressure sensor can operate effectively under all expected operating conditions. Further, a pressure sensor with a coplanar meter body can be smaller and cost less than conventional "dual head" pressure sensors, allowing this approach to be implemented in smaller and cheaper pressure sensors. In addition, a coplanar meter body can be mounted directly to a manifold, thereby eliminating expensive corrosion-resistant pressure heads, bolts, and other miscellaneous hardware and eliminating the need for joints with gaskets (which are potential leak paths for toxic or corrosive process fluids). Finally, providing overpressure protection can allow multiple piezo-resistive or other sensors to be used on a single integrated circuit chip or other structure, which allows for multiple or redundant sensor measurements to be captured. As a particular example, the same integrated circuit chip could include sensors that output both differential and static pressure measurements.

Additional details regarding a differential pressure sensor having overpressure protection with reduced output error are provided below. Note that these details relate to specific implementations of the differential pressure sensor and that other implementations could vary as needed or desired.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which a differential pressure sensor could be used.

Figure 2:
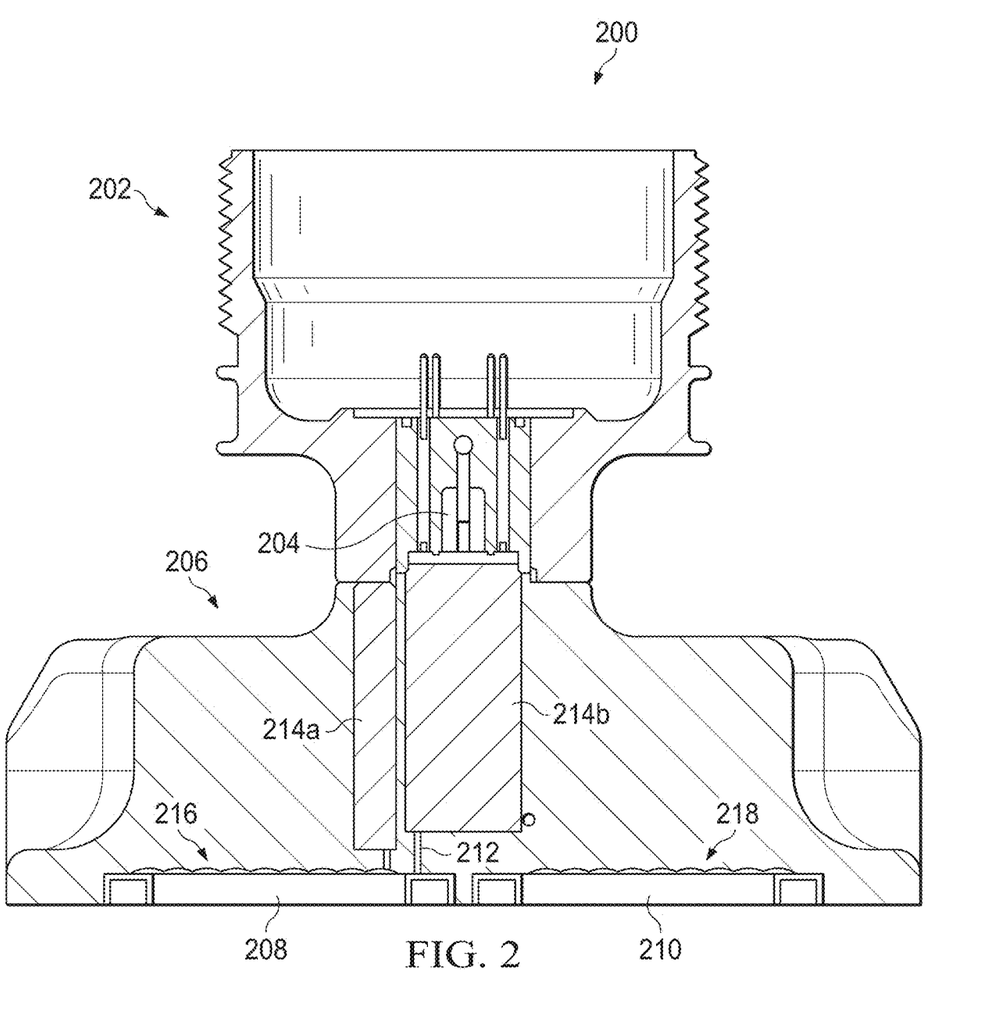
FIG. 2 illustrates an example differential pressure sensor according to this disclosure.

FIG. 2 illustrates an example differential pressure sensor 200 according to this disclosure. For ease of explanation, the differential pressure sensor 200 may be described as being used in the industrial process control and automation system 100 of FIG. 1. However, the differential pressure sensor 200 could be used in any other suitable system, and the system need not relate to industrial process control and automation.

As shown in FIG. 2, the differential pressure sensor 200 includes an adapter 202 and at least one sensor 204. The adapter 202 denotes a portion of the differential pressure sensor 200 in which wires or other signal conductors can be connected to the sensor 204. The outer surface of the adapter 202 can also be threaded or otherwise configured to facilitate attachment of the differential pressure sensor 200 to a larger device or system. The adapter 202 could be formed from any suitable material(s) and in any suitable manner. As a particular example, the adapter 202 could be formed from metal.

The sensor 204 denotes a structure that senses multiple input pressures and outputs a signal indicative of a difference between the input pressures. For example, the sensor 204 could output an electrical signal whose voltage or current varies proportionally with the difference between the input pressures. The sensor 204 includes any suitable differential pressure sensor, such as a piezo-resistive or capacitive sensor. As noted above, multiple sensors 204 could also be used, such as sensors that output both differential and static pressure measurements. Also, the multiple sensors 204 may or may not be implemented on a single integrated circuit chip. Each sensor 204 includes any suitable structure for measuring pressure.

The differential pressure sensor 200 also includes a coplanar body 206, which denotes a portion of the differential pressure sensor 200 in which multiple pressure inputs are located. The pressure inputs are generally located on a common plane, which is why the body 206 is referred to as a "coplanar" body. The coplanar body 206 could be formed from any suitable material(s) and in any suitable manner. As a particular example, the coplanar body 206 could be formed from metal. Note that the adapter 202 and the coplanar body 206 could be formed integrally or as separate pieces that are connected together, such as by welding.

The pressure inputs in the differential pressure sensor 200 are implemented using a high-pressure barrier diaphragm 208 and a low-pressure barrier diaphragm 210. Each of the barrier diaphragms 208 and 210 represents a barrier that allows pressure to be transmitted into the differential pressure sensor 200 while preventing process fluid (such as oil, gas, or other high pressure and corrosive fluid) from entering into the differential pressure sensor 200. The barrier diaphragms 208 and 210 represent flexible membranes that can move up or down in FIG. 2 based on the amount of pressure applied to the barrier diaphragms 208 and 210.

Each of the barrier diaphragms 208 and 210 denotes any suitable flexible membrane, such as a metallic membrane. Each of the barrier diaphragms 208 and 210 could also have any suitable size, shape, and dimensions. In particular embodiments, the barrier diaphragms 208 and 210 are small enough and spaced apart to fit within the established bolt pattern for industry-standard DIN manifolds. This allows the differential pressure sensor 200 to be mounted directly to a manifold.

Pressures from the barrier diaphragms 208 and 210 are transmitted to the sensor 204 via a fill fluid that travels through various passages 212. The fill fluid could denote an incompressible fluid, so pressure applied by the barrier diaphragm 208 or 210 is conveyed by the fill fluid to the sensor 204. The fill fluid denotes any suitable fluid for conveying pressure, such as silicone oil or other suitable fluid. Each passage 212 denotes any suitable passageway for fill fluid.

The pressure sensor 200 may optionally contain fluid expansion compensation elements 214a-214b, which are used to reduce the thermal expansion effect of the fill fluid. In some embodiments, it may be necessary or desirable to reduce or minimize the fluid travel of the fill fluid through the passages 212. However, this may be complicated by the need to operate the pressure sensor 200 over a large temperature range. Since the fluid expansion properties of the fill fluid may greatly exceed those of the body 206, this results in a larger volume of fluid as the temperature increases. To help handle this issue, the fluid expansion compensation elements 214a-214b can be used and denote cylindrical or other components that encircle or surround various ones of the passages 212. The fluid expansion compensation elements 214a-214b can be formed using a low thermal expansion material, such as INVAR (FeNi36 or 64FeNi) or other material with low thermal expansion as compared to the material of the coplanar body 206.

Each barrier diaphragm 208 and 210 has an associated overload or overpressure protection mechanism 216 and 218, respectively. The protection mechanisms 216 and 218 generally provide protection against overpressure conditions that can damage the differential pressure sensor 200. In a typical overpressure mechanism for a "dual head" package, a center diaphragm is positioned between and generally parallel to two opposing barrier diaphragms. This design is effective when the pressure inputs are on opposite sides of the meter body. However, as can be seen in FIG. 2, this conventional approach cannot be used cost-effectively in the differential pressure sensor 200 since the barrier diaphragms 208 and 210 are coplanar rather than on opposite sides of the body 206. Instead, the protection mechanisms 216 and 218 implement separate protection for the sensor 204. Each of the protection mechanisms 216 and 218 includes any suitable structure for providing structural reinforcement and overpressure protection. Additional details regarding example operations of the protection mechanisms 216 and 218 are provided below with respect to FIGS. 4 through 6.

A coplanar meter body can be smaller and lighter than a "dual head" package. The protection mechanisms 216 and 218 are capable of fitting into the reduced size of a coplanar meter body, so overpressure protection can be provided in a smaller pressure sensor. Moreover, a coplanar meter body can be mounted directly to a manifold that carries a process fluid. Not only does this approach result in lighter and more easily installed devices, this approach also saves the cost of corrosion-resistant pressure heads and associated hardware. In addition, as described in more detail below, the protection mechanisms 216 and 218 can be designed to reduce or minimize errors in pressure measurements generated by the sensor 204.

Although FIG. 2 illustrates one example of a differential pressure sensor 200, various changes may be made to FIG. 2. For example, the sizes, shapes, and relative dimensions of the components in FIG. 2 are for illustration only. Also, other arrangements of the components in FIG. 2 could be used in a differential pressure sensor. In addition, the overall form factor for the differential pressure sensor 200 could vary as needed or desired.

Figure 3:
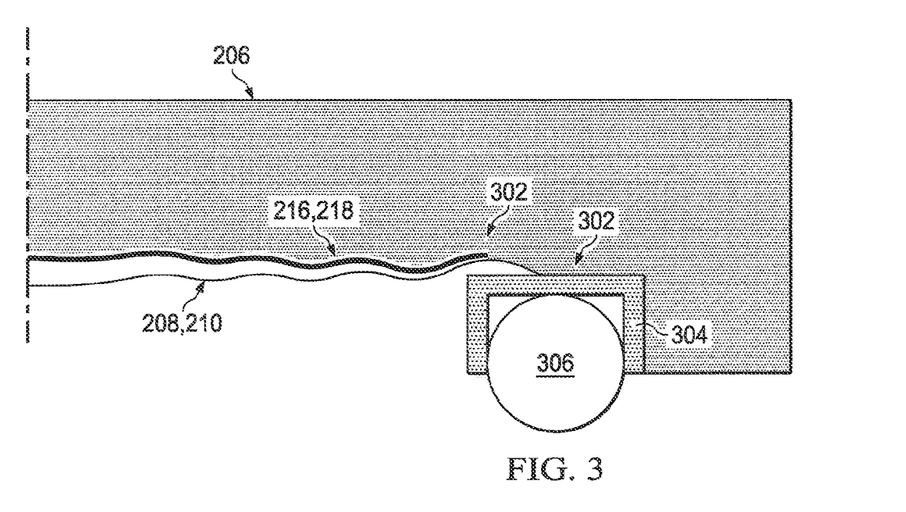
FIG. 3 illustrates an example protection mechanism in a differential pressure sensor according to this disclosure.

FIG. 3 illustrates an example protection mechanism 216, 218 in a differential pressure sensor according to this disclosure. For ease of explanation, the protection mechanism 216, 218 shown in FIG. 3 is described with respect to the differential pressure sensor 200 of FIG. 2. However, the protection mechanism 216, 218 could be used with any other suitable pressure sensor.

As shown in FIG. 3, the protection mechanism 216, 218 is implemented as an additional diaphragm that is placed behind one of the barrier diaphragms 208, 210 between that barrier diaphragm and the body 206. The protection mechanism 216, 218 could be thicker than the barrier diaphragm 208, 210. The protection mechanism 216, 218 operates to protect the sensor 204 from damage. For example, the protection mechanism 216 will move with application of pressure and allow the barrier diaphragm 210 to move and lay against the protection mechanism 218, thus stopping the further input of pressure. In a similar manner, the protection mechanism 218 will move with application of pressure and allow the barrier diaphragm 208 to move and lay against the protection mechanism 216, thus stopping the further input of pressure. In this way, individual operation of each protection mechanism 216, 218 will protect the sensor 204 from damage due to overpressure from either pressure input.

In some embodiments, the protection mechanism 216, 218 is attached to the body 206 of the differential pressure sensor 200. The barrier diaphragm 208, 210 is then placed over the protection mechanism 216, 218 and attached to the body 206 of the differential pressure sensor 200. In particular embodiments, the protection mechanism 216, 218 and the barrier diaphragm 208, 210 are attached to the body 206 using laser welds 302. Moreover, a weld or other seal ring 304 could be placed around the peripheries of the barrier diaphragm 208, 210 and the protection mechanism 216, 218. The seal ring 304 can be used to house a gasket or O-ring 306 that seals an external manifold or other component that is used to input pressures to the sensor 200.

Although FIG. 3 illustrates one example of a protection mechanism 216, 218 in a differential pressure sensor, various changes may be made to FIG. 3. For example, the sizes, shapes, and relative dimensions of the components in FIG. 3 are for illustration only.

Figure 4:
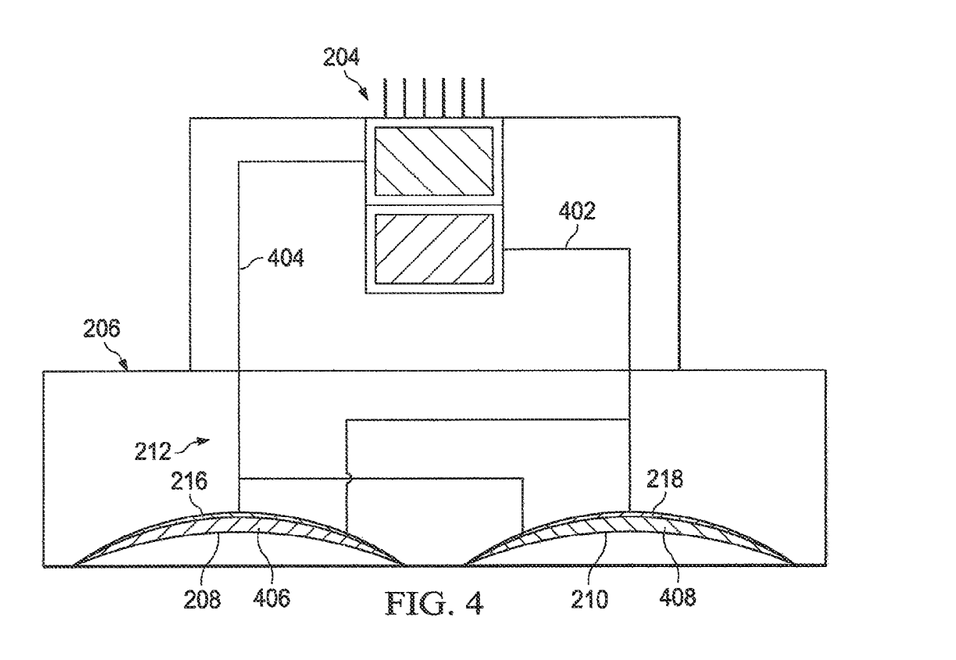
FIG. 4 illustrates example operation of a differential pressure sensor with overpressure protection according to this disclosure.

FIG. 4 illustrates example operation of a differential pressure sensor with overpressure protection according to this disclosure. For ease of explanation, the operations shown in FIG. 4 are described with respect to the differential pressure sensor 200 of FIG. 2. However, these operations could occur using any other suitable pressure sensor.

As shown in FIG. 4, internal porting is implemented in the body 206 using the passages 212 to transfer two pressure inputs to the sensor 204. A high-pressure port 402 provides a higher-pressure input to the sensor 204, and a low-pressure port 404 provides a lower-pressure input to the sensor 204.

A fill fluid 406 fills a gap between the barrier diaphragm 208 and the protection mechanism (overload diaphragm) 216. The fill fluid 306 is ported via the port 404 to both the low-pressure side of the sensor 204 and a gap between the body 206 and the other protection mechanism (overload diaphragm) 218. Similarly, a fill fluid 308 fills the gap between the barrier diaphragm 210 and the protection mechanism (overload diaphragm) 218. The fill fluid 308 is ported via the port 402 to both the high-pressure side of the sensor 204 and a gap between the body 206 and the other protection mechanism (overload diaphragm) 216.

During the application of low-side pressure, the pressure is transmitted from the barrier diaphragm 208 to the fill fluid 306 and then to the sensor 204 and to the gap between the other protection mechanism (overload diaphragm) 218 and the body 206. This causes the protection mechanism 218 to deflect away from the body 206, increasing the gap between the body 206 and the protection mechanism 218. Meanwhile, the gap between the barrier diaphragm 208 and the protection mechanism 216 is reduced. When sufficient fill fluid 406 has moved to eliminate the gap between the barrier diaphragm 208 and the protection mechanism 216, the barrier diaphragm 208 and the protection mechanism 216 nest together, and no additional pressure will be transmitted to the sensor 204, thus providing overpressure protection for the sensor 204.

In a similar manner, during the application of high-side pressure, the pressure is transmitted from the barrier diaphragm 210 to the fill fluid 308 and then to the sensor 204 and to the gap between the other protection mechanism (overload diaphragm) 216 and the body 206. This causes the protection mechanism 216 to deflect away from the body 206, increasing the gap between the body 206 and the protection mechanism 216. Meanwhile, the gap between the barrier diaphragm 210 and the protection mechanism 218 is reduced. When sufficient fill fluid 408 has moved to eliminate the gap between the barrier diaphragm 210 and the protection mechanism 218, the barrier diaphragm 210 and the protection mechanism 218 nest together, and no additional pressure will be transmitted to the sensor 204, thus providing overpressure protection for the sensor 204.

Although FIG. 4 illustrates one example of operation of a differential pressure sensor with overpressure protection, various changes may be made to FIG. 4. For example, the sizes, shapes, and relative dimensions of the components in FIG. 4 are for illustration only.

Figure 5:
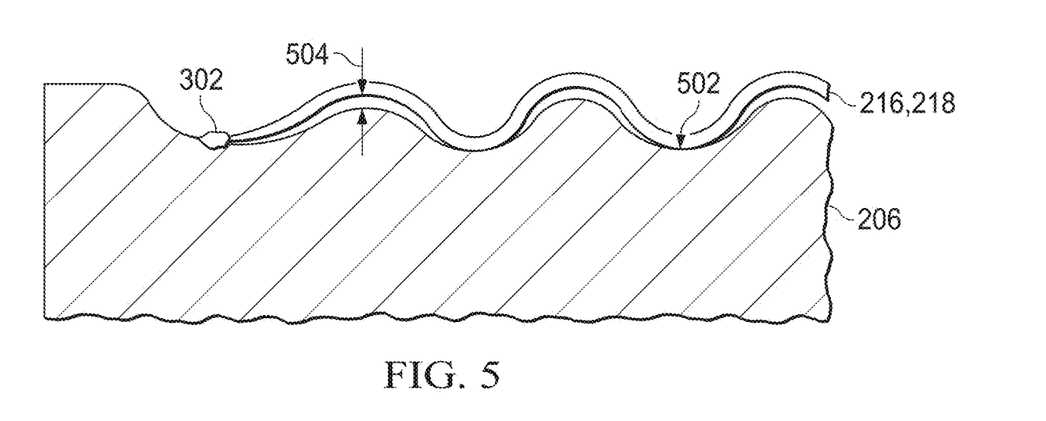
FIGS. 5 and 6 illustrate example techniques for reducing or minimizing errors in pressure measurements from a differential pressure sensor with overpressure protection according to this disclosure.
Figure 6:
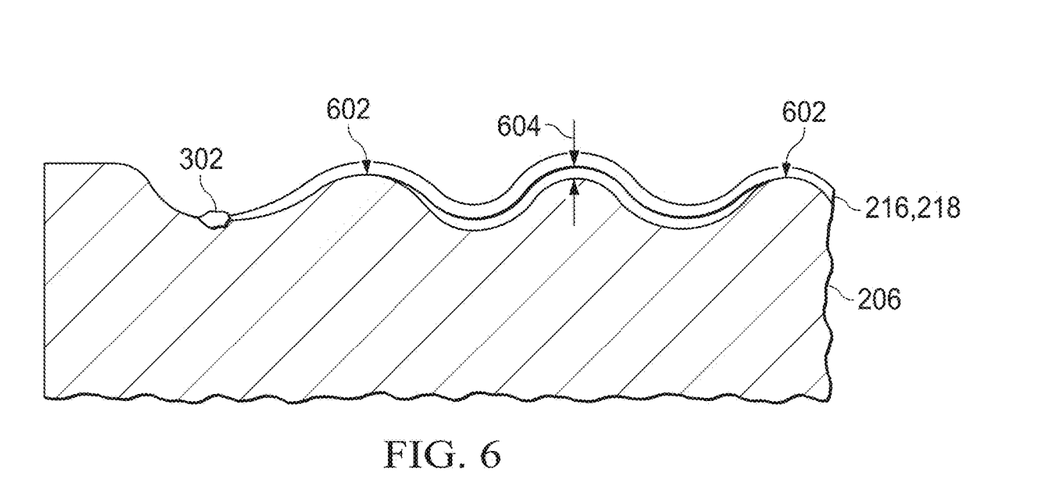

FIGS. 5 and 6 illustrate example techniques for reducing or minimizing errors in pressure measurements from a differential pressure sensor with overpressure protection according to this disclosure. For ease of explanation, the techniques shown in FIGS. 5 and 6 are described with respect to the differential pressure sensor 200 of FIGS. 2 through 4. However, these techniques could occur using any other suitable pressure sensor.

Each of the overload or overpressure protection mechanisms 216 and 218 shown in FIGS. 2 through 4 functions by movement of an overload diaphragm away from the adjacent surface of the body 206. Ideally, no movement of the overload diaphragm away from the body 206 occurs within an expected operating range of the differential pressure sensor 200. However, above some threshold pressure, movement of the overload diaphragm away from the body 206 would occur.

This can be achieved by installing an overload diaphragm such that a preload force is exerted by the overload diaphragm against the body 206. A threshold amount of pressure would then be needed to overcome the preload force and move the overload diaphragm. The preload force and the quality of the fit between the overload diaphragm and the body 206 can also help to avoid any movement of the overload diaphragm toward the body 206. The sum of these two potential movements (toward the body 206 and away from the body 206) within the expected operating range of the differential pressure sensor 200 can cause measurement errors, such as in the form of hysteresis. To reduce movement of an overload diaphragm within the expected operating range of the differential pressure sensor 200 and still allow full movement above the threshold pressure, a fit of the overload diaphragm to the body 206 can be controlled.

FIGS. 5 and 6 illustrate two examples of the fit between a protection mechanism 216, 218 (an overload diaphragm) and the body 206. In FIG. 5, the protection mechanism 216, 218 is installed with a preload force against the body 206. The geometry of the protection mechanism 216, 218 and the mating geometry of the body 206 are modified such that bases 502 of convolutions of the protection mechanism 216, 218 have a preload force against the body 206, while the tops of the convolutions of the protection mechanism 216, 218 have gaps 504 between the protection mechanism 216, 218 and the body 206. The support at the bases 502 can reduce or minimize travel at pressures below the preload force, while the gaps 504 at the tops of the convolutions can ensure rapid and precise movement of the protection mechanism 216, 218 away from the body 206 when the preload force is exceeded.

In FIG. 6, the protection mechanism 216, 218 is installed with a preload force against the body 206. The geometry of the protection mechanism 216, 218 and the mating geometry of the body 206 are modified such that non-adjacent tops 602 of convolutions of the protection mechanism 216, 218 have a preload force against the body 206, while there are gaps 604 at the tops of the convolutions between the non-adjacent convolutions. The support at the non-adjacent tops 602 can reduce or minimize travel at pressures below the preload force, while the gaps 604 at the tops of the convolutions between the non-adjacent convolutions can ensure rapid and precise movement of the protection mechanism 216, 218 away from the body 206 when the preload force is exceeded.

Although FIGS. 5 and 6 illustrate examples of techniques for reducing or minimizing errors in pressure measurements from a differential pressure sensor with overpressure protection, various changes may be made to FIGS. 5 and 6. For example, any other suitable fit between a protection mechanism 216, 218 and the body 206 could be used.

Figure 7:
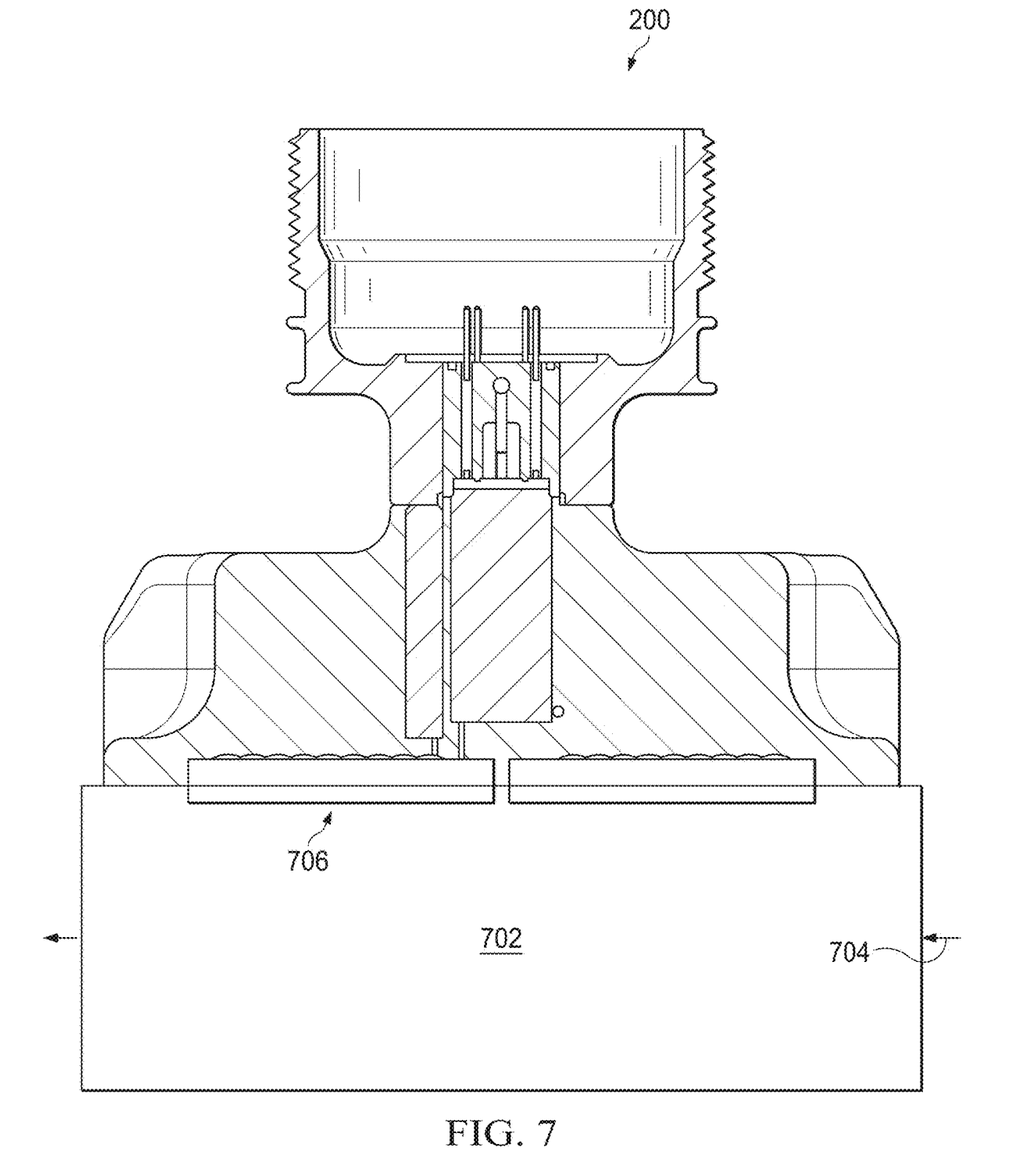
FIG. 7 illustrates an example use of a differential pressure sensor with overpressure protection according to this disclosure.

FIG. 7 illustrates an example use of a differential pressure sensor 200 with overpressure protection according to this disclosure. For ease of explanation, the use shown in FIG. 7 is described with respect to the differential pressure sensor 200 of FIG. 2. However, the differential pressure sensor 200 could be used in any other suitable manner.

As shown in FIG. 7, the differential pressure sensor 200 is mounted directly to a manifold 702. The manifold 702 denotes any suitable structure that is configured to transport at least one process fluid 704. As noted above, the manifold 702 could be configured to transport one or more corrosive process fluids at high pressures. The manifold 702 could have any suitable size, shape, and dimensions and could be formed from any suitable material(s).

The differential pressure sensor 200 can be mounted directly to openings 706 of the manifold 702. The openings 706 could have any suitable size, shape, and dimensions and could be separated by any suitable distance. As noted above, for example, the manifold 502 could denote an industry-standard DIN manifold, and the barrier diaphragms 208 and 210 can be small enough and spaced apart to fit within the established bolt pattern for the DIN manifold.

Although FIG. 7 illustrates one example use of a differential pressure sensor 200 with overpressure protection, various changes may be made to FIG. 7. For example, the differential pressure sensor 200 could be used in any other suitable manner and need not be used with a manifold.

FIG. 8 illustrates an example method 800 for overpressure protection with reduced output error according to this disclosure. For ease of explanation, the method 800 shown in FIG. 8 is described with respect to the differential pressure sensor 200 of FIG. 2 operating as shown in FIG. 4. However, the method 800 could be used with any other suitable pressure sensor.

As shown in FIG. 8, preload forces are applied by overload diaphragms of a differential pressure sensor against a body of the differential pressure sensor at step 802. This could include, for example, the protection mechanisms 216 and 218 applying the preload forces against the body 206 of the differential pressure sensor 200. The preload forces can be defined, at least in part, based on the fit of the protection mechanisms 216 and 218 against the body 206.

Input pressures are received at barrier diaphragms of the differential pressure sensor at step 804. This could include, for example, receiving input pressures at the barrier diaphragms 208 and 210 of the pressure sensor 200. As a particular example, this could include receiving input pressures at the barrier diaphragms 208 and 210 of the pressure sensor 200 through openings 706 of the manifold 702. The input pressures are transferred to at least one pressure sensor at step 806. This could include, for example, the fill fluid 406 and 408 transferring the input pressures from the barrier diaphragms 208 and 210 to the at least one sensor 204 through the ports 402 and 404. One or more pressure measurements are generated at step 808. This could include, for example, the at least one sensor 204 generating an electrical signal whose voltage or current varies proportionally with the difference between the input pressures. This could also include different sensors 204 generating multiple pressure measurements, such as multiple differential pressure measurements or differential and static pressure measurements.

If no overpressure condition exists at step 810, the process returns to step 804 so that additional pressure measurements can be generated. However, if an overpressure condition on one of the barrier diaphragms exists at step 810, the process includes additional steps used to protect the pressure sensor(s) from damage. For example, during an overpressure condition on a specified one of the barrier diaphragms, fill fluid is transferred out of a space between the specified barrier diaphragm and its associated overload diaphragm at step 812. This could include, for example, the fill fluid 406 between the barrier diaphragm 208 and the protection mechanism 216 moving via the port 402 to a gap between the body 206 and the other protection mechanism 218. This could also include the fill fluid 408 between the barrier diaphragm 210 and the protection mechanism 218 moving via the port 404 to a gap between the body 206 and the other protection mechanism 216. This applies force to the protection mechanism 216 or 218, which can overcome the preload force applied by that protection mechanism 216 or 218 and cause that protection mechanism 216 or 218 to move away from the body 206.

If enough fill fluid is transferred, the specified barrier diaphragm eventually nests against its associated overload diaphragm at step 814. This could include, for example, the barrier diaphragm 208 contacting and resting against the protection mechanism 216 or the barrier diaphragm 210 contacting and resting against the protection mechanism 218. This helps to prevent additional pressure from reaching the pressure sensor(s) at step 816. This could include, for example, the associated protection mechanism 216, 218 preventing the specified barrier diaphragm 208, 210 from further movement inward, which could otherwise apply an excessive pressure via the fill fluid 406, 408 to the pressure sensor(s) 204.

Although FIG. 8 illustrates one example of a method 800 for overpressure protection with reduced output error, various changes may be made to FIG. 8. For example, while shown as a series of steps, various steps in FIG. 8 could overlap, occur in parallel, occur in a different order, or occur any number of times. As a particular example, steps 806-808 could occur at the same time as steps 810-816 so that overpressure protection is provided in parallel with the generation of pressure measurements.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a sensor body including a low-pressure side and a high-pressure side;
   a sensor disposed between the low-pressure side and the high-pressure side and configured to measure differential pressure; and
   first and second pressure inputs, the first pressure input associated with the low-pressure side of the sensor body and the second pressure input associated with the high-pressure side of the sensor body, the pressure inputs configured to apply at least one input pressure from the low-pressure side and the high-pressure side to the sensor, each pressure input comprising:
   a barrier diaphragm associated with each of the first and second pressure inputs and configured to move in response to pressure; and
   an overload diaphragm associated with each of the first and second pressure inputs and configured to limit movement of the barrier diaphragm, wherein the overload diaphragm is configured to exert a preload force against the sensor body,
   wherein the overload diaphragm associated with each of the first and second pressure inputs is operable to move away from the sensor body in response to a pressure that overcomes the preload force,
   wherein the overload diaphragm associated with each of the first and second pressure inputs includes multiple convolutions, wherein bases of the convolutions are operable to provide the preload force against the sensor body, and tops of the convolutions are separated from the sensor body by gaps.

2. The apparatus of claim 1, further comprising:
   a first fill fluid configured to convey the pressure from the barrier diaphragm of the first pressure input to the sensor as a first input pressure; and
   a second fill fluid configured to convey the pressure from the barrier diaphragm of the second pressure input to the sensor as a second input pressure.

3. The apparatus of claim 2, further comprising:
   at least one first passage configured to transport the first fill fluid between (i) a gap between the barrier diaphragm of the first pressure input and the overload diaphragm of the first pressure input and (ii) the sensor and a gap between the overload diaphragm of the second pressure input and the sensor body; and
   at least one second passage configured to transport the second fill fluid between (i) a gap between the barrier diaphragm of the second pressure input and the overload diaphragm of the second pressure input and (ii) the sensor and a gap between the overload diaphragm of the first pressure input and the sensor body.

4. The apparatus of claim 3, wherein:
   the tops of the convolutions that are non-adjacent are configured to provide the preload force against the sensor body; and
   the tops of the convolutions between the non-adjacent convolutions are separated from the sensor body by gaps.

5. The apparatus of claim 1, wherein the barrier diaphragm of each pressure input is configured to nest with the overload diaphragm of that pressure input.

6. The apparatus of claim 1, wherein the sensor comprises one of multiple sensors.

7. The apparatus of claim 1, wherein the sensor body is a coplanar meter body.

8. A system comprising:
   a manifold; and
   a pressure sensor mounted to the manifold, the pressure sensor comprising:
   a sensor body including a low-pressure side and a high-pressure side;
   a sensor disposed between the low-pressure side and the high-pressure side and configured to measure differential pressure; and
   first and second pressure inputs, the first pressure input associated with the low-pressure side of the sensor body and the second pressure input associated with the high-pressure side of the sensor body, the pressure inputs configured to apply at least one input pressure from the low-pressure side and the high-pressure side to the sensor, each pressure input comprising:
a barrier diaphragm associated with each of the first and second pressure inputs and configured to move in response to pressure; and
an overload diaphragm associated with each of the first and second pressure inputs and configured to limit movement of the barrier diaphragm, wherein the overload diaphragm is configured to exert a preload force against the sensor body,
wherein the overload diaphragm associated with each of the first and second pressure inputs is operable to move away from the sensor body in response to a pressure that overcomes the preload force,
wherein the overload diaphragm associated with each of the first and second pressure inputs includes multiple convolutions, wherein bases of the convolutions are operable to provide the preload force against the sensor body, and tops of the convolutions are separated from the sensor body by gaps.

9. The system of claim 8, wherein the pressure sensor further comprises:
a first fill fluid configured to convey the pressure from the barrier diaphragm of the first pressure input to the sensor as a first input pressure; and
a second fill fluid configured to convey the pressure from the barrier diaphragm of the second pressure input to the sensor as a second input pressure.

10. The system of claim 9, wherein the pressure sensor further comprises:
at least one first passage configured to transport the first fill fluid between (i) a gap between the barrier diaphragm of the first pressure input and the overload diaphragm of the first pressure input and (ii) the sensor and a gap between the overload diaphragm of the second pressure input and the sensor body; and
at least one second passage configured to transport the second fill fluid between (i) a gap between the barrier diaphragm of the second pressure input and the overload diaphragm of the second pressure input and (ii) the sensor and a gap between the overload diaphragm of the first pressure input and the sensor body.

11. The system of claim 10, wherein:
the tops of the convolutions that are non-adjacent are configured to provide the preload force against the sensor body; and
the tops of the convolutions between the non-adjacent convolutions are separated from the sensor body by gaps.

12. The system of claim 8, wherein the barrier diaphragm of each pressure input is configured to nest with the overload diaphragm of that pressure input.

13. A method comprising:
applying at least one input pressure to a sensor disposed within a sensor body from a low-pressure input and a high-pressure input of the sensor body; and
measuring a differential pressure using the sensor;
wherein each pressure input comprises:
a barrier diaphragm associated with each of the pressure inputs and configured to move in response to pressure; and
an overload diaphragm associated with each of the pressure inputs and configured to limit movement of the barrier diaphragm, the overload diaphragm exerting a preload force against the sensor body,
wherein the overload diaphragm associated with each of the first and second pressure inputs is operable to move away from the sensor body in response to a pressure that overcomes the preload force,
wherein the overload diaphragm associated with each of the first and second pressure inputs includes multiple convolutions, wherein bases of the convolutions are operable to provide the preload force against the sensor body, and tops of the convolutions are separated from the sensor body by gaps.

14. The method of claim 13, further comprising:
conveying, using a first fill fluid, the pressure from the barrier diaphragm of the first pressure input to the sensor as a first input pressure; and
conveying, using a second fill fluid, the pressure from the barrier diaphragm of the second pressure input to the sensor as a second input pressure.

15. The method of claim 14, further comprising:
transporting, through at least one first passage, the first fill fluid between (i) a gap between the barrier diaphragm of the first pressure input and the overload diaphragm of the first pressure input and (ii) the sensor and a gap between the overload diaphragm of the second pressure input and the sensor body; and
transporting, through at least one second passage, the second fill fluid between (i) a gap between the barrier diaphragm of the second pressure input and the overload diaphragm of the second pressure input and (ii) the sensor and a gap between the overload diaphragm of the first pressure input and the sensor body.

16. The method of claim 15, wherein:
the tops of the convolutions that are non-adjacent provide the preload force against the body; and
the tops of the convolutions between the non-adjacent convolutions are separated from the sensor body by gaps.

* * * * *